United States Patent [19]

Maroldo et al.

[11] Patent Number: 5,217,505
[45] Date of Patent: Jun. 8, 1993

[54] CARBONACEOUS ADSORBENTS FOR PREVENTION OF CARBON BED FIRES

[75] Inventors: Stephen G. Maroldo, Harleysville; Mark T. Vandersall, Jamison, both of Pa.

[73] Assignee: Rohm and Haas Company, Philadelphia, Pa.

[21] Appl. No.: 947,187

[22] Filed: Sep. 18, 1992

[51] Int. Cl.$^5$ .................... B01D 55/08; B01D 53/02
[52] U.S. Cl. ............................ 55/16; 55/74; 55/158; 502/402; 502/416; 502/418; 521/29; 521/53; 521/146; 521/918
[58] Field of Search ............... 521/29, 146, 918, 53; 55/16, 74, 158; 502/416, 402, 418

[56] References Cited

U.S. PATENT DOCUMENTS

| | | | |
|---|---|---|---|
| 4,040,990 | 8/1977 | Neely | 260/2.1 R |
| 4,256,840 | 3/1981 | Meitzner et al. | 521/33 |
| 4,382,124 | 5/1983 | Meitzner et al. | 521/38 |
| 4,839,331 | 6/1989 | Maroldo et al. | 502/416 |

OTHER PUBLICATIONS

Akubuiro, E. C. and Wagner, N. S., Ind. Eng. Chem. Res., 31, 339-346 (1992).
Kohl, E. and Serowy, J. Chem. Tech. (Leipzig), 33(9), 475-477 (1981).
Lukchis, G. M. Chemical Engineering, Jul. 9, (1973).
Mizutani, M. Minemoto, M. and Hirao, M. Kagaku Kogaku Ronbunshu 16(1) 23-30 (1990).
Naujokas, A. A. Plant Oper. Prog. 4(2), 120-126 (1985).
Naujokas, A. A. Loss Prev. 1978 (12), 128-135 (1979).
Takeuchi, Y., Mizutani, M. and Ikeda, H. J. Chem. Eng. Japan 23(1), 68-74 (1990).

*Primary Examiner*—Morton Foelak
*Attorney, Agent, or Firm*—Kevin E. McVeigh

[57] ABSTRACT

A process for removing an oxidizable organic compound from an oxidizing gas stream which includes contacting the gas stream with a bed of carbonaceous adsorbent particles, wherein the adsorbent particles comprise porous pyrolyzed particles of a polysulfonated cross-linked synthetic copolymer, to adsorb the oxidizable organic compound on the adsorbent particles.

22 Claims, No Drawings

CARBONACEOUS ADSORBENTS FOR PREVENTION OF CARBON BED FIRES

TECHNICAL FIELD

The present invention relates to processes for adsorption of volatile organic compounds from gas streams.

BACKGROUND

Activated carbon technology is widely used in processes for solvent recovery and air pollution abatement. In some applications, e.g., adsorption of organic vapors from air streams, an activated carbon bed containing adsorbed organic compounds is operated in the presence of oxygen.

Incidents of runaway exothermic reactions and combustion of adsorbent beds have been reported under conditions wherein an oxidizable organic compound, e.g., a ketone, aldehyde or organic acid, is adsorbed in an activated carbon bed in the presence of oxygen, see, e.g., E. C. Akubuiro, N. J. Wagner, "Assessment of Activated Carbon Stability Toward Adsorbed Organics", *Ind. Eng. Chem. Res.* 31, 339-346 (1992); A. A. Naujokas, "Spontaneous Combustion of Carbon Beds", *Plant/Operations Progress* Vol. 4, No. 2 (April 1985); A. A. Naujokas, "Preventing Carbon Bed Combustion Problems", *Loss Prev.*, 1978 (12), 128-135.

The combustion phenomenon presents a particularly severe problem in applications where activated carbon bed adsorption is used to recover cyclohexanone, see, e.g., M. Mizutani, M. Minemoto and M. Hirao, "Prevention of the Ignition Phenomenon of Activated Carbon Beds During Recovery of Solvent Containing Cyclohexanone", *Kagaku Kogaku Ronbushu*, 16 (1), 23-30 (1990); Y. Takeuchi, M. Mizutani and H. Ikeda, "Prevention of Activated Carbon Bed Ignition and Degradation During the Recovery of Cyclohexanone", *Journal of Chemical Engineering of Japan* Vol. 23, No. 1, 68-74 (1990).

The carbon bed combustion problem has been addressed by the addition of moisture to the gas stream, see, e.g., Takeuchi et al, above, and by purging the bed with an inert gas during shutdown, see, e.g., Mizutani et al, above. However, each of these approaches may detrimentally affect the operating efficiency of the bed, i.e., moisture in the gas stream reduces capacity of the adsorbent for adsorbing organic compounds and an inert purge gas stream effectively forces the mass transfer region of the bed toward the outlet of the bed.

SUMMARY OF THE INVENTION

A process for removing an oxidizable organic compound from an oxidizing gas stream is disclosed. The process comprises contacting the gas stream with a bed of carbonaceous adsorbent particles, wherein the adsorbent particles comprise porous pyrolyzed particles of a polysulfonated cross-linked synthetic copolymer, to adsorb the oxidizable organic compound on the adsorbent particles. The pyrolyzed copolymeric adsorbent particles in combination with adsorbed oxidizable organic compound exhibit reduced oxidative activity in the presence of an oxidizer compared to activated carbon particles under the same conditions. Due to the low oxidative activity of the combination of the pyrolyzed copolymeric adsorbent particles and the oxidizable organic compound adsorbed thereon, the adsorption bed does not develop localized temperature excursions and the bed remains free of localized areas of combustion.

In a preferred embodiment, the oxidizable organic compound is selected from the group consisting of acetone, methyl isobutyl ketone, methyl ethyl ketone, diisobutyl ketone, diethyl ketone, ethyl butyl ketone, diacetone alcohol, cyclohexanone, acetaldehyde, propionaldehyde, butyraldehyde, crotonaldehyde, butyl acetate, methyl isobutyl carbinol, acetic acid, propionic acid and butyric acid.

In a particularly preferred and advantageous embodiment, the oxidizable organic compound is cyclohexanone or butyraldehyde.

In a preferred embodiment, the synthetic copolymer is a vinyl aromatic copolymer.

In a preferred embodiment, the polysulfonated copolymer contains, prior to pyrolysis, a minimum of about 1.04 times the sulfur content that may be introduced to the same copolymer by monosulfonation.

In a preferred embodiment, the adsorbent particles exhibit greater than or equal to about 0.05 milliliters macropore volume/gram adsorbent.

In a preferred embodiment, the particles are pyrolyzed at a temperature between about 300° C. and about 1200° C. in an inert atmosphere for a time period of about 15 minutes to about 2 hours.

In a preferred embodiment, the adsorbent particles exhibit a specific surface area of greater than about 90 $m^2$ surface area/g adsorbent.

In a preferred embodiment, the adsorbed oxidizable organic compound is desorbed from the adsorbent particles of the bed and collected to recover the compound. The oxidizable organic compound recovered by the process of the present invention exhibits a reduced level of contamination by oxidation products of the compound, compared to the same compound recovered using an activated charcoal adsorbent under the same conditions.

DETAILED DESCRIPTION OF THE INVENTION AND BEST MODE

As used herein, the terminology "readily oxidizable organic compounds" means those organic compounds which react with oxygen at moderate temperature, i.e., between about 50° C. and about 150° C., in the presence of activated carbon. An exemplary method for evaluating an organic compound to determine whether the compound is a readily oxidizable organic compound is given by A. A. Naujokas in *Loss Prev* 1978, 12 at page 129, i.e., the organic compound (0.25 vol % in air) is introduced to an activated carbon (Union Carbide JXC 4/6 mesh) bed (5 cm dia×90 cm length) at a superficial gas stream velocity of 25 cm/s and at an initial bed temperature of either 100° C. or 125° C. Bed temperature and CO concentration in the outlet stream from the bed are monitored and increases in bed temperature and the presence of CO in the outlet stream are each taken as indications of oxidative activity in the bed. A second exemplary method for evaluating an organic compound to determine whether the compound is readily oxidizable, wherein the temperature of a mass of adsorbent imbibed with the organic compound is monitored and an exotherm is taken as an indication of oxidative activity, is illustrated in Example 3 set forth below.

Readily oxidizable organic compounds of particular interest are oxygenated aliphatic or alicyclic organic compounds, e.g., ketones, ethers, aldehydes, alcohols and organic acids.

Exemplary readily oxidizable organic compounds include, e.g., acetone, methyl isobutyl ketone, methyl ethyl ketone, ethyl butyl ketone, diisobutyl ketone, diethyl ketone, diacetone alcohol, cyclohexanone, acetaldehyde, propionaldehyde, butyraldehyde, crotonaldehyde, butyl acetate, methyl isobutyl carbinol, acetic acid, propionic acid, and butyric acid.

In a preferred embodiment of the process of the present invention, the readily oxidizable organic compound is a ketone, aldehyde or carboxylic acid and includes from 1 to 10 carbon atoms per molecule, e.g., methyl isobutyl ketone, diisobutyl ketone, ethyl butyl ketone, methyl ethyl ketone, diethyl ketone, cyclohexanone, propionaldehyde, butyraldehyde, propionic acid and butyric acid.

In a particularly advantageous embodiment of the process of the present invention, the readily oxidizable organic compound comprises cyclohexanone or butyraldehyde.

The oxidizing agent contained in the gas stream may itself be gas phase and/or may form all or part of a discontinuous liquid phase entrained in the gas stream. Suitable oxidizing agents include, e.g., oxygen, peroxides, perchlorates, and permanganates. While the process of the present invention is advantageous when applied to the removal and recovery of volatile oxidizable organic compounds from any gas stream which includes both the volatile oxidizable organic compound and an oxidizing agent, the process is of particular practical and economic significance in the removal of volatile readily oxidizable organic compounds from manufacturing process air streams, e.g., in a solvent recovery and/or air pollution abatement system.

The carbonaceous absorbent particles of the absorbent bed of the process of the present invention are porous pyrolyzed particles of a polysulfonated cross-linked synthetic copolymer.

Suitable cross-linked synthetic copolymer particles are those prepared by copolymerizing two or more ethylenically unsaturated monomers, wherein at least one of said monomers is a crosslinking monomer that includes two or more ethylenically unsaturated sites per molecule.

Preferably, the synthetic copolymer comprises a vinyl aromatic copolymer. Suitable vinyl aromatic copolymers are those in which at least 50%, preferably 90% and most preferably 98%, of the monomeric units are derived from vinylaromatic monomers. Suitable vinyl aromatic monomers include, e.g., styrene, p-methylstyrene, ethylvinyl benzene, vinyl naphthalene, divinylbenzene, and diisopropenylbenzene.

Preferred vinyl aromatic copolymers are those copolymers prepared by polymerizing a vinyl aromatic monomer having a single ethylenically unsaturated site per molecule, preferably styrene or a mixture of styrene and ethylvinyl benzene, and vinyl aromatic crosslinking monomer having two or more ethylenically unsaturated sites per molecule, preferably divinylbenzene or diisopropenylbenzene. The level of crosslinking monomer in the copolymer may be from about 2% to 98% by weight of the copolymer and is preferably from about 39% to about 80% by weight of the copolymer.

Preferably, the cross-linked synthetic copolymeric particles are macroporous particles exhibiting greater than about 0.05 milliliters (ml) macropore volume/gram (g) adsorbent and preferably from about 0.10 ml macropore volume/g adsorbent to about 0.30 ml macropore volume/g adsorbent. As referred to herein, macropores are pores characterized by an average pore diameter greater than 500 Ångstroms (Å), wherein the pore diameters are determined by nitrogen porosimetry. Suitable macroporous cross-linked synthetic copoymeric particles may be prepared by, e.g., suspension polymerization in the presence of a precipitant, as described in U.S. Pat. No. 4,256,840, the disclosure of which is incorporated herein by reference. It will be apparent to one skilled in the art that suitable particles may be made by other methods as well, e.g., the technique described in U.S. Pat. No. 3,122,514.

The cross-linked copoymeric particles are stabilized by polysulfonation as described in U.S. Pat. No. 4,839,331, the disclosure of which is incorporated herein by reference. As used herein, polysulfonation refers to a sulfonation process that is sufficiently vigorous to introduce an average of more than one sulfonate group per accessible aromatic nucleus of the vinyl aromatic copolymer and suitable polysulfonated particles of copolymer are particles in which the microanalytical value for sulfur introduced into the copolymer by polysulfonation is at least 1.04 times, preferably at least 1.07 times and more preferably at least 1.16 times the value for sulfur introduced by conventional monosulfonation. Particles of cross-linked vinylaromatic copolymer may be polysulfonated by, e.g., contacting the particles with oleum or with fuming sulfuric acid at an elevated temperature, e.g., from about 100° C. to about 150° C.

Pyrolysis of the polysulfonated particles may be conducted by any of the methods taught in U.S. Pat. No. 4,040,990, the disclosure of which is incorporated herein by reference. As discussed in the '990 patent, pyrolysis of macroporous stabilized cross-linked copolymeric particles introduces micropores to the particles and results in particles that exhibit a multimodal pore size distribution. As used herein, mesopores are pores chracterized by an average pore diameter between 20 Å and 500 Å and micropores are pores characterized by an average pore diameter less than 20 Å, wherein the respective pore diameters are determined by nitrogen porosimetry.

Pyrolysis conditions are selected to provide a desired specific micropore volume and a desired specific surface area to the particles. Suitable pyrolyzed adsorbent particles exhibit greater than or equal to about 0.02 ml micropore volume/g adsorbent, preferably exhibit greater than or equal to about 0.05 ml micropore volume/g adsorbent and more preferably exhibit greater than or equal to about 0.1 ml micropore volume/g adsorbent. Suitable pyrolyzed adsorbent particles exhibit a specific surface area greater than or equal to about 90 m$^2$/g adsorbent, preferably exhibit a specific surface area greater than or equal to about 170 m$^2$/g adsorbent and more preferably exhibit a specific surface area greater than or equal to about 300 m$^2$/g adsorbent. Preferably, the pyrolysis is a controlled pyrolysis at temperatures from about 300° C. to about 1200° C., more preferably from about 300° C. to about 800° C., for a period of about 15 minutes to about two hours.

The pyrolyzed polysulfonated material may be used as such, or it may optionally be activated by processes known to the art such as exposure to various activating gases, including oxygen, steam, water, ammonia, carbon monoxide, carbon dioxide, and the like, at temperatures from about 300° C. to about 1200° C. or more. It is also possible to conduct the pyrolysis in the presence of an activating gas rather than in an inert gas such as nitrogen. At temperatures below about 800° C., pyrolysis is the kinetically dominating process, and little effect of the activating gas is seen at relatively short pyrolysis times. At pyrolysis temperatures above about 800° C., or with lengthy exposure to the activating gas at temperatures between about 300° C. and about 800° C., both pyrolysis and activation can be accomplished.

Preferably, the polysulfonated copolymeric particles used in the process of the present invention are pyrolyzed in an inert atmosphere and are not activated by exposure to an activating gas.

Suitable carbonaceous adsorbent particles, e.g., Ambersorb ® 563 adsorbent, Ambersorb ® 572 adsorbent, are commercially available from the Rohm and Haas Company, Philadelphia, PA.

A gas stream including a readily oxidizable organic compound and an oxidizing agent is contacted, e.g. in a tubular reactor, with a bed of carbonaceous adsorbent particles, wherein the particles comprise the above described porous pyrolyzed particles of a polysulfonated cross-linked synthetic copolymer, under conditions effective to allow adsorption of the oxidizable compound on the adsorbent particles of the bed. The pyrolyzed copolymeric adsorbent particles of the bed in combination with the oxidizable organic compound adsorbed on the pyrolyzed copolymeric adsorbent particles exhibit reduced oxidative activity in the presence of the oxidizing agent present in the gas stream flowing through the bed, compared to particles of an activated charcoal adsorbent under the same conditions.

The bed of carbonaceous adsorbent may comprise a substantially homogenous mixture of the above described pyrolyzed copolymeric adsorbent particles and activated adsorbent particles, wherein the above discussed advantages associated with the pyrolyzed copolymer adsorbent particles increase with increasing relative amount of those particles in the mixture.

Processes for removing organic compounds from gas streams using carbonaceous adsorbents are known, see, e.g., Lukchis, G. M., "Adsorption Systems Part II: Equipment Design:, Chem. Eng., Jul. 9, 1973, and the adsorbent bed of the present invention and related process equipment may be designed and the process parameters of the process of the present invention may be optimized according to conventional practice in the art, but without the complications imposed by the oxidation and combustion problems encountered when removing oxidizable organic compounds from an oxidizing agent-containing gas stream using a bed of activated charcoal adsorbent. The process of the present invention is particularly advantageous in a thermally insulated adsorption bed operated under substantially adiabatic conditions.

The adsorbed oxidizable organic compound may be desorbed from the adsorbent particles of the bed by, e.g., heating and/or displacement by steam or nitrogen, and collected to recover the oxidizable organic compound. The recovered oxidizable organic compound produced by the process of the present invention is substantially free of oxidation products of the oxidizable organic compound.

EXAMPLE 1

The relative amount of cyclohexanone oxidation in the presence of several respective carbonaceous adsorbents (pyrolyzed copolymeric adsorbents A, B and C and activated charcoal adsorbents AA, BB and CC, each described below) in air, at room temperature, was determined.

Adsorbents were loaded with cyclohexanone using a static vapor technique wherein a sample of adsorbent (5 grams) was sealed in a laboratory dessicator, initially at ambient pressure, above a volume (50 ml) of liquid cyclohexanone and maintained at room temperature for 1200 hours.

The pyrolyzed copolymeric adsorbents used in the experiments were each made by respective methods taught in U.S. Pat. No. 4,839,331 ("the '331 patent) which has been incorporated herein by reference. A detailed description of each of the methods is provided by the respective portions of the '331 patent indicated below (a summary of each of the methods is also provided below).

The cross-linked vinylaromatic particles were made by the method set forth in Example 1 of the '331 patent, i.e. by polymerization of a mixture of styrene and sufficient commercial (55%) divinylbenzene to give 18.5% divinylbenzene in the particles, using 33.4% methyl amyl alcohol as a precipitant. The particles so produced were polysulfonated by the method set forth in Example 3 of the '331 patent, i.e. by contacting the particles with oleum at 120° C. The polysulfonated particles were then subjected to pyrolysis or to pyrolysis and activation as follows:

pyrolyzed copolymeric particles "A" were pyrolyzed under the conditions set forth in Example 5 of the '331 patent for sample 5A, i.e., pyrolysis at 500° C. in $N_2$;

pyrolyzed copolymeric particles "B" were pyrolyzed under the conditions set forth in Example 4(i) of the '331 patent for sample 4A, i.e. by pyrolysis at 800° C. in $N_2$; and pyrolyzed copolymeric particles "C" were pyrolyzed and activated under the conditions set forth in Example 14 of the '331 patent for sample 14B, i.e. by pyrolysis at 800° C. in $N_2$, followed by steam activation at 800° C.

Physical properties, i.e., BET surface area, (expressed as square meter surface area/gram adsorbent ($m^2/g$)) and respective micropore, mesopore and macropore volumes (each expressed as milliliters pore volume/gram adsorbent (ml/g)), characterizing pyrolyzed copolymeric adsorbent particles A, B, and C were measured by nitrogen porosimetry using a Micromeritics ASAP-2400 porosimeter and are set forth in Table 1 below.

TABLE 1

| Pyrolyzed Copolymeric Adsorbent | BET Surface Area ($m^2/g$) | Micropore Volume (ml/g) | Mesopore Volume (ml/g) | Macropore Volume (ml/g) |
|---|---|---|---|---|
| A | 702 | 0.26 | 0.14 | 0.23 |
| B | 677 | 0.25 | 0.13 | 0.21 |
| C | 1291 | 0.49 | 0.19 | 0.24 |

The activated charcoal samples used in the experiments were obtained from various commercial sources (as identified in Table 2 below).

The vapor-exposed adsorbents were transferred into 25 ml vials and weighed. Aliquots (10 ml) of HPLC grade acetone were added to the vials. The vials were capped with inert fluoropolymer lined caps and agitated overnight on a mechanical flat bed laboratory shaker. After 18 hours of shaking, the contents of the sample vials were removed using syringe-tip 0.45 um filters (Millipore Millex ® HV) and transferred to fresh 25 ml sample vials, each capped with an inert fluoropolymer lined cap.

The filtrate samples were analyzed by gas chromatography and mass spectroscopy for the presence of oxidization products of cyclohexanone, i.e., cyclohexanedione and adipic acid. The cyclohexanedione eluted in one peak which could not be resolved into the 1,2, 1,3 and 1,4 isomers of cyclohexanedione and is therefore reported as total cyclohexanedione. The respective area counts of the chromatographic peaks for cyclohexanedione and adipic acid for each sample were divided by the area count of the cyclohexanone peak for the respective sample, in order to provide an estimate of the amounts of cyclohexanedione and adipic acid relative to the amount of cyclohexanone in each sample.

Results (the ratios of areas of the respective cyclohexanedione and adipic acid peaks to the area of the cyclohexanone peak for each respective sample, expressed as percentages) are set forth in Table 2.

TABLE 2

| Adsorbent | Total Cyclohexanedione/ Cyclohexanone (%) | Adipic Acid/ Cyclohexanone (%) |
|---|---|---|
| Pyrolyzed copolymeric Adsorbent A | 0.84 | 0.00 |
| Pyrolyzed copolymeric Adsorbent B | 1.08 | 0.00 |
| Pyrolyzed copolymeric Adsorbent C | 0.57 | 0.00 |
| Activated charcoal Adsorbent AA$_1$ | 6.07 | 1.44 |
| Activated charcoal Adsorbent BB$_2$ | 3.06 | 1.75 |
| Activated charcoal Adsorbent CC$_3$ | 4.37 | 0.00 |

$_1$BPL 12 × 30 (Calgon Carbon Corp.)
$_2$Nuchar BX-7540 (Westvaco Chemical Div.)
$_3$Sar-0 (Kureha Chemical Co.)

EXAMPLE 2

The relative amount of cyclohexanone oxidation in the presence of several respective carbonaceous adsorbents (pyrolyzed copolymeric adsorbents A, B and C and activated charcoal adsorbents AA and BB, described above in Example 1, and activated charcoal adsorbent DD, identified below in Table 3) in air at 75° C. was determined substantially according to the method set forth in Example 1 above, but with the following exceptions: 1) the adsorbent samples were loaded under static vapor conditions for 112 hours, 2) each vapor-exposed adsorbent was aged at 75° C. for 24 hours prior to extraction with acetone, filtration and analysis, and 3) a 0.32 mm × 15 m DB Wax column was used for the chromatographic analysis. It was determined that cyclohexanonedione was present mostly as 1,2-cyclohexanedione with very small amounts of the 1, 3 and 1, 4 isomers detected. The results (the ratios of the area counts for the respective 1,2-cyclohexanedione and adipic acid peaks to the area count of the cyclohexanone peak of each respective sample, expressed as percentages) are given in Table 3.

TABLE 3

| Adsorbent | 1,2-cyclohexanedione/ Cyclohexanone (%) | Adipic Acid/ Cyclohexanone (%) |
|---|---|---|
| Pyrolyzed copolymeric adsorbent A | 2.58 | 0.13 |
| Pyrolyzed copolymeric adsorbent B | 2.45 | 0.22 |
| Pyrolyzed copolymeric adsorbent C | 2.21 | 0.12 |
| Activated charcoal adsorbent AA | 12.99 | 2.67 |
| Activated charcoal adsorbent BB | 6.58 | 2.12 |
| Activated Charcoal adsorbent DD$_1$ | 5.20 | 0.17 |

$_1$BAC-MP (Kureha Chemical Co.)

EXAMPLE 3

Samples of carbonaceous adsorbents were tested for reactivity toward methyl ethyl ketone (MEK).

A sample (400 cc) of pyrolyzed copolymeric adsorbent A (described above in Example 1) was dried overnight at 80° C. A weighed 300 cc sample of the dried adsorbent was placed in a 1 liter Erlenmeyer flask. A mixture of 15 grams deionized water and 22.5 g methyl ethyl ketone was prepared and added to the flask and the flask containing the adsorbent/water/ketone mixture was vigorously agitated for 5 minutes. The adsorbent/water/ketone mixture was transferred to a 665 ml Dewar flask that had been preheated overnight to 80° C. The Dewar flask was placed in a convection oven set at 80° C. with a first thermocouple installed in the center of the adsorbent/water/ketone mixture within the flask and a second thermocouple was installed on the outside of the flask. The temperatures indicated by the respective thermocouples were recorded. Results are reported in Table 4 below as exotherm temperature, i.e., the maximum value by which the temperature at first thermocouple exceeded the simultaneously recorded temperature at second thermocouple, and exotherm onset time, i.e. elapsed time to reach the reported exotherm temperature.

Samples of a pyrolyzed copolymeric adsorbent and of activated charcoal adsorbents AA and DD, described above in Examples 1 and 2, respectively, were tested for MEK reactivity by the procedure outlined above for pyrolyzed copolymeric adsorbent A. Results are reported in Table 4 for each sample as exotherm temperature (°C.) and exotherm onset time (h).

TABLE 4

| Adsorbent | Exotherm Temperature (°C.) | Exotherm Onset (h) |
|---|---|---|
| Pyrolyzed copolymeric adsorbent A | 13 | 45 |
| Pyrolyzed copolymeric adsorbent C | 31 | 36 |
| Activated charcoal adsorbent AA | 71 | 5 |
| Activated charcoal adsorbent DD | 39 | 22 |

The process of the present invention is of particular practical and economic significance in the removal and/or recovery of readily oxidizable volatile organic compounds, especially cyclohexanone, from manufacturing process air streams in order to protect the environment and recover manufacturing resources.

We claim:
1. A process for removing a readily oxidizable organic compound from an gas stream, said gas stream including an oxidizing agent, comprising:

contacting the gas stream with a bed of carbonaceous adsorbent particles, said adsorbent particles comprising porous pyrolyzed particles of a polysulfonated cross-linked synthetic copolymer containing mesopores that are characterized by an average pore diameter between 20 angstrom and 500 angstrom units and micropores that are pores characterized by an average pore diameter of less than 20 angstrom units to adsorb said oxidizable compound on said adsorbent particles.

2. The process of claim 1, wherein said readily oxidizable organic compound is a compound that undergoes oxidation in air in the presence of activated carbon at a temperature between about 80° C. and about 150° C.

3. The process of claim 2, wherein the readily oxidizable compound is selected from the group consisting of ketones, esters, ethers, aldehydes, alcohols and organic acids.

4. The process of claim 3, wherein the oxidizable organic compound is selected from the group consisting of acetone, methyl isobutyl ketone, methyl ethyl ketone, diisobutyl ketone, diethyl ketone, ethyl butyl ketone, diacetone alcohol, cyclohexanone, acetaldehyde, propionaldehyde, butyraldehyde, crotonaldehyde, butyl acetate, methyl isobutylcarbinol, acetic acid, propionic acid and butyric acid.

5. The process of claim 4, wherein said readily oxidizable organic compound is selected from the group consisting of methyl isobutyl ketone, diisobutyl ketone, methyl ethyl ketone, ethyl butyl ketone, diethyl ketone, cyclohexanone, propionaldehyde, butyraldehyde, propionic acid and butyric acid.

6. The process of claim 5, wherein said readily oxidizable organic compound is cyclohexanone or butyraldehyde.

7. The process of claim 1, wherein the gas stream comprises an air stream and the oxidizing agent comprises oxygen.

8. The process of claim 1, wherein the gas stream is introduced to the bed at a temperature from about 20° C. to about 75° C.

9. The process of claim 1, wherein a substantially uniform temperature distribution is maintained in the bed during the contacting.

10. The process of claim 1, wherein said adsorbent particles in combination with adsorbed readily oxidizable organic compound exhibit reduced oxidative activity in the presence of the oxidizing agent relative to an activated carbon adsorbent under the same conditions.

11. The process of claim 1, wherein the bed pyrolyzed particles of solubilized cross-linked synthetic copolymer adsorbent particles exhibits a reduced propensity for spontaneous ignition of the bed compared to a bed of activated carbon adsorbent particles under the same conditions.

12. The process of claim 1, wherein the bed is free of localized areas of combustion.

13. The process of claim 1, wherein the synthetic copolymer is a vinyl aromatic copolymer.

14. The process of claim 13, wherein the vinyl aromatic copolymer comprises the polymerized reaction product of a monovinyl aromatic monomer and a divinyl aromatic polymer.

15. The process of claim 1, wherein the polysulfonated copolymer contains, prior to pyrolysis, a minimum of about 1.04 times the sulfur content which may be introduced to the same copolymer by monosulfonation.

16. The process of claim 1, wherein the particles are pyrolyzed at a temperature between about 300° C. and about 1200° C. in an inert atmosphere for a time period of about 15 minutes to about 2 hours.

17. The process of claim 1, wherein the adsorbent particles exhibit greater than or equal to about 0.05 ml macropore volume/g adsorbent.

18. The process of claim 1, wherein the adsorbent particles exhibit a specific surface area of greater than or equal to about 90 $m^2$/g adsorbent.

19. A process for removing an oxidizable organic compound from an oxygen containing gas stream, comprising:
contacting the gas stream with a bed of carbonaceous adsorbent to adsorb the oxidizable organic compound;
wherein the improvement comprises using porous pyrolyzed particles of a polysulfonated cross-linked synthetic copolymer containing mesopores that are characterized by an average pore diameter between 20 angstrom and 500 angstrom units and micropores that are pores characterized by an average pore diameter of less than 20 angstrom units.

20. A process for recovering an oxidizable organic compound from an oxygen containing gas stream, comprising;
contacting the gas stream with a bed of carbonaceous adsorbent particles, said adsorbents particles comprising porous pyrolyzed particles of a polysulfonated cross-linked synthetic copolymer containing mesopores that are characterized by an average pore diameter between 20 angstrom and 500 angstrom units and micropores that are pores characterized by an average pore diameter of less than 20 angstrom units to adsorb said oxidizable compound on said adsorbent particles;
desorbing said oxidizable organic compound from said adsorbent particles; and
collecting desorbed oxidizable organic compound to recover the compound; said recovered oxidizable organic compound exhibiting a reduced level of contamination by oxidation products of the compound compared to the same compound recovered using an activated charcoal adsorbent.

21. The process of claim 20, wherein the gas stream is an air stream.

22. The process of claim 20, wherein the oxidizable organic compound is cyclohexanone and the oxidation products of the oxidizable organic compound comprise cyclohexanedione and adipic acid.

* * * * *